United States Patent
Dole

(10) Patent No.: US 6,628,786 B1
(45) Date of Patent: *Sep. 30, 2003

(54) DISTRIBUTED STATE RANDOM NUMBER GENERATOR AND METHOD FOR UTILIZING SAME

(75) Inventor: Bryn Dole, Palo Alto, CA (US)

(73) Assignee: Sun Microsystems, Inc., Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/941,677

(22) Filed: Sep. 30, 1997

(51) Int. Cl.$^7$ ................................ H04L 9/22
(52) U.S. Cl. ............................ 380/44; 380/263
(58) Field of Search ................ 380/44, 48, 262, 380/263

(56) References Cited

U.S. PATENT DOCUMENTS

| | | | | |
|---|---|---|---|---|
| 4,211,891 A | * | 7/1980 | Glitz | 380/48 |
| 5,241,598 A | * | 8/1993 | Raith | 380/21 |
| 5,369,706 A | * | 11/1994 | Latka | 380/23 |
| 5,412,721 A | * | 5/1995 | Rager et al. | 380/21 |
| 5,420,925 A | * | 5/1995 | Michaels | 380/23 |
| 5,621,799 A | * | 4/1997 | Katta et al. | 380/48 |
| 5,727,062 A | * | 3/1998 | Ritter | 380/37 |
| 5,740,249 A | * | 4/1998 | Shimizu et al. | 380/28 |
| 5,748,734 A | * | 5/1998 | Mizikovsky | 380/21 |
| 5,778,069 A | * | 7/1998 | Thomlinson et al. | 380/25 |
| 5,802,175 A | * | 9/1998 | Kara | 380/21 |
| 6,122,379 A | * | 9/2000 | Barbir | 380/269 |

OTHER PUBLICATIONS

Bruce Schneier, Applied Cryptography, 1996, 33, 180, 513–514.*

Shannon, C.E., The Bell Technical Journal, "A Mathematical Theory of Communication," v. 27, n. 4, 1948, pp. 379–423.*

* cited by examiner

Primary Examiner—Gilberto Barrón
Assistant Examiner—Douglas Meislahn
(74) Attorney, Agent, or Firm—Beyer Weaver & Thomas LLP

(57) ABSTRACT

A system and method for generating random numbers utilizing a shared or distributed source of entropy is disclosed. In one embodiment, the invention allows networked computers to generate and share entropy in proportion to the need for random numbers utilized to initialize the internal state of random number generators residing on the computers. A shared session key generated during communications between a first and second computer is appended to the current internal state of the random number generators residing on the computers to create a bit string. The bit string is then mixed or hashed using a one-way "hash" function such as message digest function to produce a mixed bit string. At least a portion of the mixed bit string is then used to reinitialize the internal state of the random number generators residing on the computers. Since the initial state of the random number generators residing on the computers will be different, the values used to reinitialize the internal state of the generators will be different. In the case of a computer network, the internal state of each host computer's random number will thus ultimately be dependent upon on the internal state of every other computer that the host has communicated with and the order in which the communications took place.

27 Claims, 4 Drawing Sheets

DISTRIBUTED STATE RANDOM NUMBER GENERATOR AND METHOD FOR UTILIZING SAME

TECHNICAL FIELD

The present invention relates in general to a system and method for generating random numbers and, more particularly, to the generation of random numbers utilized in encrypting transmissions among and between computers and related devices in a network system.

BACKGROUND OF THE INVENTION

An ever increasing number of individuals and companies use computer networks, such as the Internet, to transmit and process a wide variety of information. In some cases, the information transmitted is confidential or proprietary and there exists the potential for abuse if the information is accessed by an unauthorized third party. For example, increasing numbers of companies are exploring the option of taking orders for goods and services over the Internet. Similarly, there is increasing interest in conducting financial transactions, such as personal banking, over the Internet.

However, since ordering a product or service, or conducting personal banking over the Internet, may require the transmission of information such as a credit card number or a bank account number, there is an increasing need for heightened security to protect the information. The problem is further compounded by the inherent openness of a system such as the Internet that permits access to the vast volume of electronic messages which flow from user to user throughout the system. Normally, an individual user's access is limited only to the extent that he or she has an account with a service provider, a valid password and account and/or mailbox identifiers. Passwords and identification numbers can, however, be acquired by third parties that, in turn, may disseminate the information to others. Further, in addition to data integrity and secrecy, authentication is an important factor. For example, bank account information should only be available to the owner of the account. Cryptographic authentication schemes and methods also make use of random numbers. Consequently, there is a growing need for reliable encryption of confidential and sensitive information.

To satisfy the need for transmission security, there have been a number of devices and algorithms developed for encoding information to be transmitted and decoding the information upon receipt. It is, of course, desirable to encrypt the information to be transmitted that makes it as difficult as possible to break the code or key used in the encryption process.

Typically, messages to be encrypted, referred to as plaintext, are encrypted using an encryption algorithm or cipher to produce ciphertext which is transmitted and subsequently decrypted by the receiver. In most cases the encryption algorithm is publicly known; in fact, by publicizing the algorithm, the cryptographer obtains the benefit of peer review by academic cryptologists attempting to break the cipher. Well known ciphers such as the Digital Encryption Standard ("DES"), the International Data Encryption Algorithm ("IDEA") and RSA, known by the initials of the three discovers (Rivest, Shamir, Adleman), are widely used to encrypt electronic transmissions. Since most widely used ciphers are publicly known, it is a fundamental rule of cryptology that it must be assumed that the attacker knows the general method of encryption used to transform the plaintext to ciphertext. It must also be assumed that the attacker has the ability to intercept and accurately copy the ciphertext message.

The algorithms used for encrypting data tend to be complicated mathematical functions that require considerable effort and time to develop, test and implement. Consequently, it is impractical to invest the resources required to develop a new cipher each time the encryption method has been compromised or believed to be compromised. Thus, the secrecy of the encrypted message depends upon the key used to parameterize the algorithm. A key normally consists of a relatively short string of data that determines how an algorithm performs a specific encryption or decryption. In contrast to the general algorithm, which may be changed or modified only with the expenditure of significant resources, the key may be changed as often as required. One approach, known as public key cryptography, requires each user to have two keys: a public key used by the transmitting party to encrypt a message, and a private session key, used by the receiving party to decrypt the message. In many applications it is desirable to utilize a different, randomly chosen session key for each new connection. Session keys are used to minimize the amount of information protected by a selected key, thereby reducing the amount of information that an attacker could obtain by monitoring repeated transmissions and guessing any one session key. Session keys are also used to increase the speed of encryption.

The quality of the algorithm and the quality of the keys used by the algorithm are independent. If weak keys are selected, it does not follow that the algorithm is flawed or requires replacement. If, however, the encryption algorithm is weak, then the key selection does not ensure the security of the transmission. The converse is not true; i.e., if poor (no-random or partially random), keys are selected and the ciphertext is compromised, the breach is not a reflection upon the quality of the algorithm.

Usually, strong encryption methods require significant processing time due to the complexity of the algorithm. To increase the speed of encryption, a strong, secure algorithm such as RSA is initially used to negotiate a session key between two host computers. The session key is then used in a faster, but less secure, encryption algorithm such as DES to encrypt the communications between the two host machines. Since session keys change frequently and require the encryption of relatively little data, the risk presented by using a less secure algorithm is generally acceptable. However, the security of a cryptographic protocol utilizing a session key, or any other secret key, depends upon the unpredictability of the key. If an attacker can predict, or even reduce the number of possible keys that must be tested, the difficulty of breaking the key is greatly reduced; i.e. a predictable key is virtually worthless for the purpose of encrypting a transmission. Thus, random number generators are always used to generate session keys.

Random number generators are typically comprised of three components: 1) an internal state (value); 2) a randomizing function; and 3) an internal state update function. A binary bit stream consisting of zeros and ones may represent the internal state of the random number generator. Each time the random number generator is invoked, the randomizing function is performed on the internal state to produce a new random number and reinitialize the internal state using an internal state update function. The internal state provides input to the randomizing function, without which the random number generator would produce the same value repeatedly. The internal state update function allows the random number generator to create a sequence of random numbers by constantly changing the internal state with each iteration of the random number generator.

After the random number generator has been initialized or "seeded" with an internal state it can generate one or more random numbers. However, due to the inherent deterministic nature of computers, the randomness of the output of the generator is dependent upon the randomness of the data or information utilized to initialize the generator. If the values used to initialize the generator are predictable, the output values from the generator will also be predictable. If the output of the random number generator is predictable, its value as a cryptographic tool is minimized. Therefore, the internal state update function will ideally minimize the occurrence of repeated internal states. However, if the internal state is repeated, the random numbers generated will be repeated.

Generating truly random numbers for use as keys for encrypting electronic messages presents a number of difficulties. The only measure of the true randomness of the output of normal random number generator is through the use of statistical analysis to determine the distribution, frequency and possible interdependence of the output. If these statistical criteria are not met, the output of the random number generator cannot be considered truly random. Additionally, providing random numbers for use as keys in encrypting electronic communications between computers presents further challenges. The randomizing function itself must be difficult to reverse or invert and the quantity of entropy in the random number stream must be sufficiently high to make guessing the internal state of the random number generator infeasible. The term "entropy" as used herein refers to the concept of entropy in the context of information theory as discussed in C. E. Shannon, *A Mathematical Theory of Communication*, Bell Systems Technical Journal, v. 27, n. 4, 1948, pp. 379–423.

Entropy, in the cryptographic sense, is the amount of information that a message contains. In other words, cryptographic entropy can be viewed as the minimum number of bits required to represent the data of interest. Thus, the entropy of a random key is the number of bits required to represent all possible keys. Ideally, the entropy of a randomly selected key is equal to its length, i.e., every bit in the key is completely random and independent of every other bit in the key. Maximizing the amount of entropy contained in a cryptographic key is a primary consideration in encryption of electronic transmissions. The harder a particular key is to guess, the longer the encrypted data remains secret. The greater the amount of entropy contained in a key, the greater the difficulty in guessing the key or determining the key with a brute force attack.

The advent of high-speed processors has increased the difficultly of securely encrypting a transmission. The amount of processing power possessed by readily available present-day computers has made "brute force" attacks feasible. A brute force attack is one in which an exhaustive search of all possible keys is conducted. Current technology provides the means to test literally millions of possible keys in a matter of seconds. Therefore it is essential to maximize the amount of entropy utilized in the creation of an encryption key. If the entropy of the key is not equal to its size, the number of keys that would have to be tested in a brute force attack is reduced. For example, if the key is a six bit string or value, there are a total of 64 ($2^6$) possible keys. However, if only even numbers are used in the key, the entropy of any one key is only five bits ($2^5=32$) because the lowest order bit will always be equal to zero. Thus, the number of keys to test in a brute force attack upon the encryption is halved. Although the foregoing example is simplistic, it illustrates the need for entropy in random key generation.

Gathering entropy on a computer is a difficult task. Computers, by design, are deterministic predictable machines that execute a set of instructions in the exact same way each time the instructions are invoked. One possible solution to the problem of providing entropy is to install hardware in each computer that can generate random numbers based upon physical phenomena such as the rate of radioactive decay of an element or the thermal noise of a semiconductor diode. This solution is not viable due to a number of factors including cost and the perception that hardware sources of random numbers are not needed.

Many computer applications utilize external events to gather entropy such as the timing between a user's keystrokes, movements of the mouse, or the input from a digitized audio source. However, in a network, where computers act as servers to other computers, as in the case of file servers, mail servers or web servers, these external sources of entropy do not exist. Server machines typically do not have any users that directly use the server from a monitor and keyboard; the user's only interaction with the machine is over the network. Since these machines are isolated from random external physical phenomena, the task of acquiring entropy presents additional challenges. If a machine is required to generate a large number of cryptographic keys, for example as in the case of web server running Secure Sockets Layer ("SSL"), a cryptographic protocol developed to provide secure Internet transactions, the machine will have a high demand for entropy in the form of many generated session keys but no external source of random physical events. The same problem exists in the context of network firewalls and routers. These network devices rarely have any direct user interaction and typically communicate only with other computers.

Thus there exists a need for an improved method of providing the entropy necessary to generate random numbers used as secret keys for encrypting electronic communications between computers, and in particular, encrypting communications between computers on a network, such as the Internet.

SUMMARY OF THE INVENTION

The present invention provides a solution for the problems encountered in providing a quality source of entropy by sharing part of the internal state of each random number generator present on computers transmitting data over a network as the computers communicate. By sharing sources of entropy, session keys generated and utilized to encrypt the communications between computers are created from a larger pool of entropy. The method of the present invention improves the quality of entropy by allowing machines with no physical source of entropy to gather entropy by communicating with other machines and insuring that machines that generate many random session keys do not run the risk of depleting their local supplies of entropy. The present invention achieves these goals because, as the number of computers and systems communicating increases, the more entropy will be created.

The present invention provides a means of creating hard to guess secret keys needed for a variety of encryption algorithms and protocols. The invention allows network computers to generate and share entropy in proportion to the need to generate random numbers utilized to initialize an internal state or value that is subsequently processed by a random number generator to create secret session keys for communicating sensitive information over a computer network. In one embodiment, shared session keys are appended to the existing internal state of the random number generators residing on the communicating computers. The resulting bit stream is then mixed or "hashed" using a one-way function such MD5 or SHA to produce a mixed bit stream. All or a portion of the mixed bit stream is then utilized as a source of entropy to reinitialize the internal state of the random number generator on one or both of the communicating computers.

The present invention provides features that have not previously been provided on a computer network. In particular, the invention supplies a steady stream of quality entropy to the random number generator; it satisfies the demand for more random session keys as the demand for keys increases; and it provides machines with poor or no sources of entropy, such as network servers, with an adequate source of quality entropy.

The present invention addresses the need for providing an unpredictable internal state (value) to a random number generator by distributing the state between multiple computing nodes. Although the amount of entropy provided by each node may be small, the cumulative entropy provided by all the nodes is large, thereby satisfying the need for a quality source of entropy.

DETAILED DESCRIPTION

Figure 1:
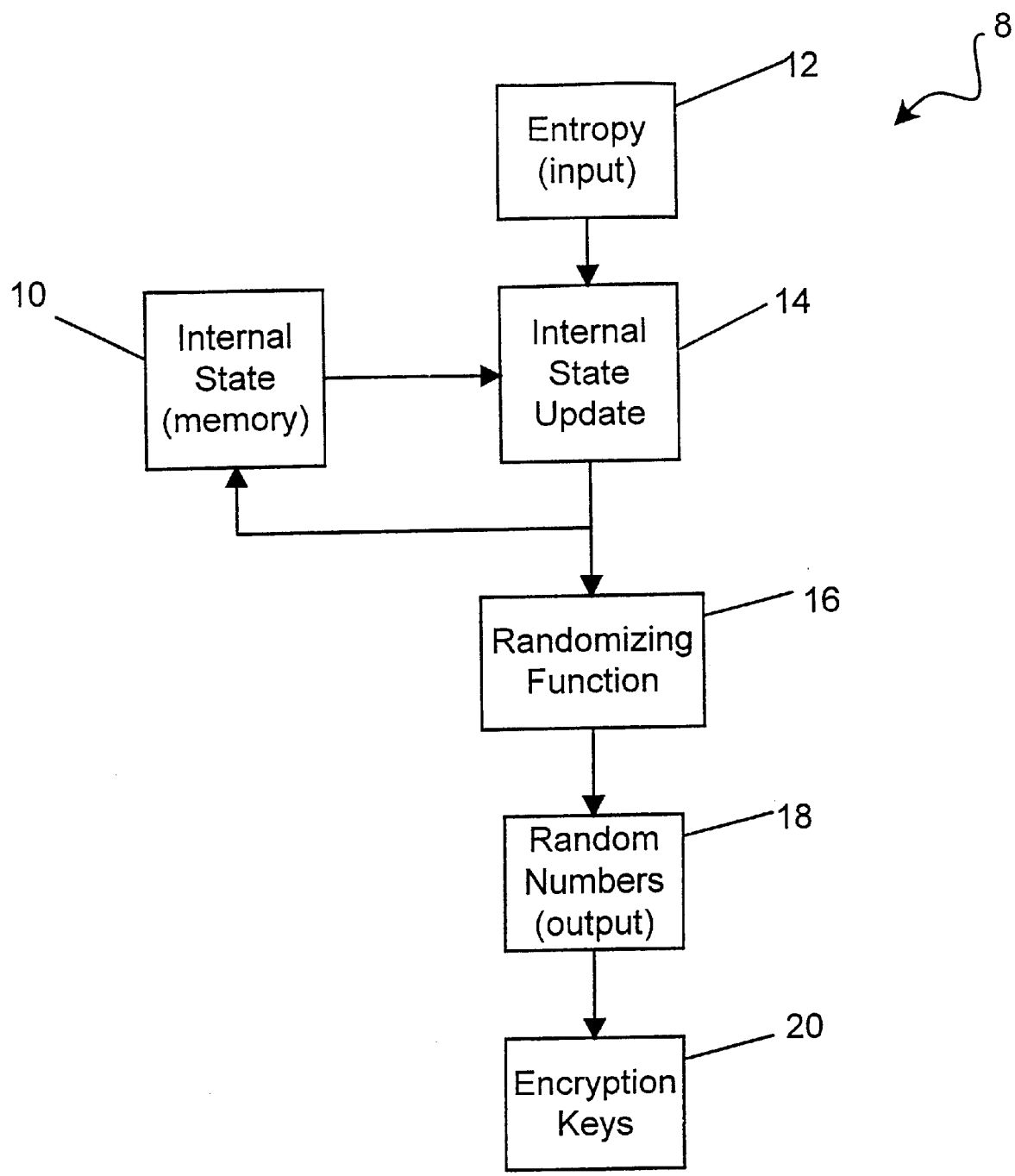
FIG. 1 is a flowchart the operation of a generic random number used to create session key for encrypting communications in accordance with a preferred embodiment.

Referring now to FIG. 1, a generalized schematic of a random number generator 8 for use in encrypting electronic messages is illustrated. The random number generator includes an internal state or value 10, a source of entropy 12, and an internal state update function 14 which may comprise, or be based upon, one or more algorithms.

Values from the entropy source 12 are used to initialize the internal state update function 14 that in turn provides a source of entropy for changing the value of the internal state 10. Values from the internal state 10 are manipulated by randomizing function 16 to produce a stream of random numbers 18. The stream of random numbers 18 is then utilized to generate encryption keys 20.

Figure 2:
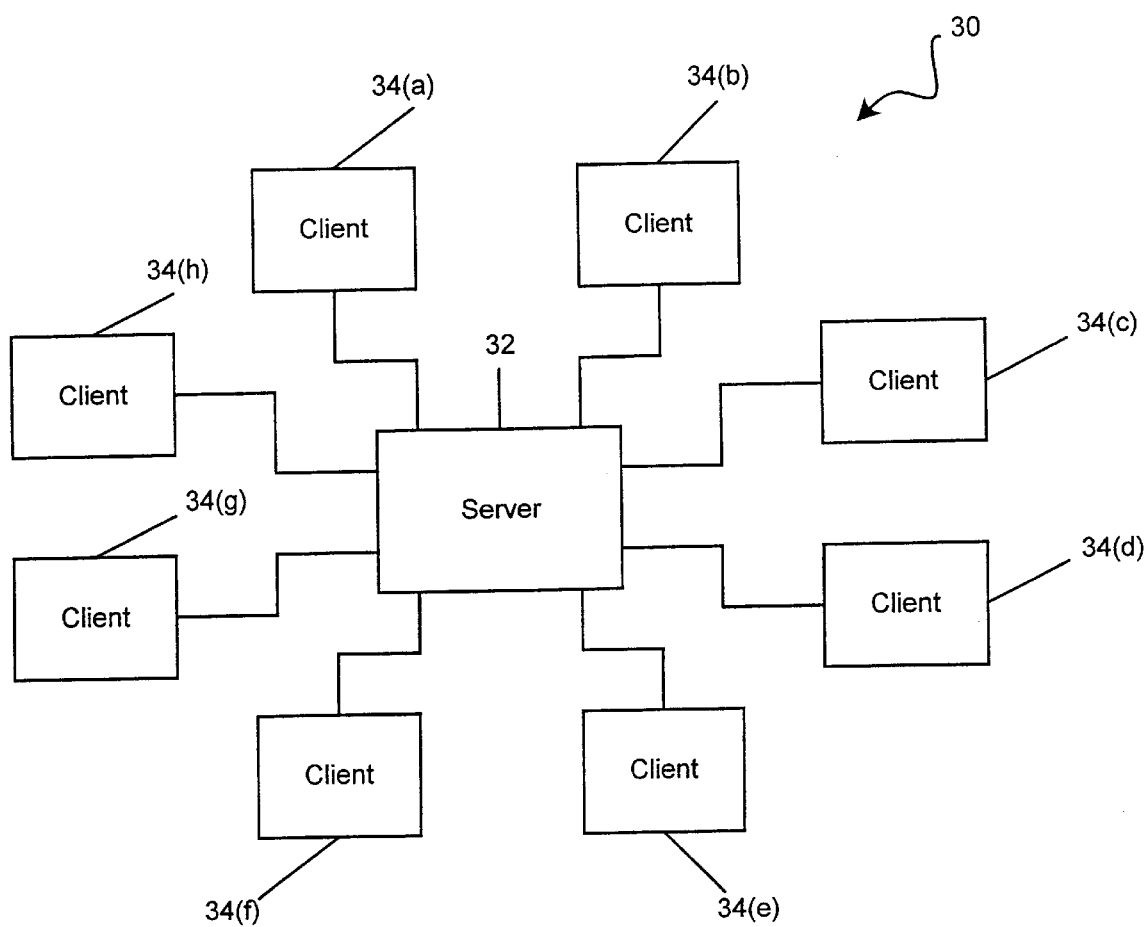
FIG. 2 an illustration of a computer network in which a file server communicates with multiple client computers in accordance with a preferred embodiment.

Turning now to FIG. 2, there is illustrated a computer network 30. The network includes a file server 32 and client computers 34(a)–34(h). File server 32 may be part of a distributed network functioning to connect and communicate with other computers in a network such as the Internet. Since file server 32 communicates only with client computers 34(a)–34(h) it is effectively insulated from external physical sources of entropy such as the time between user keystrokes. Client computers 34(a)–34(h) may be utilized to communicate sensitive or confidential information to and from the file server 32, information that will require encryption for security reasons. In order to encrypt the information transmitted between the file server 32 and the client computers 34(a)–34(h) a shared secret session key will be used to transform the communication. Normally, the shared secret session key will be utilized only once.

Figure 3:
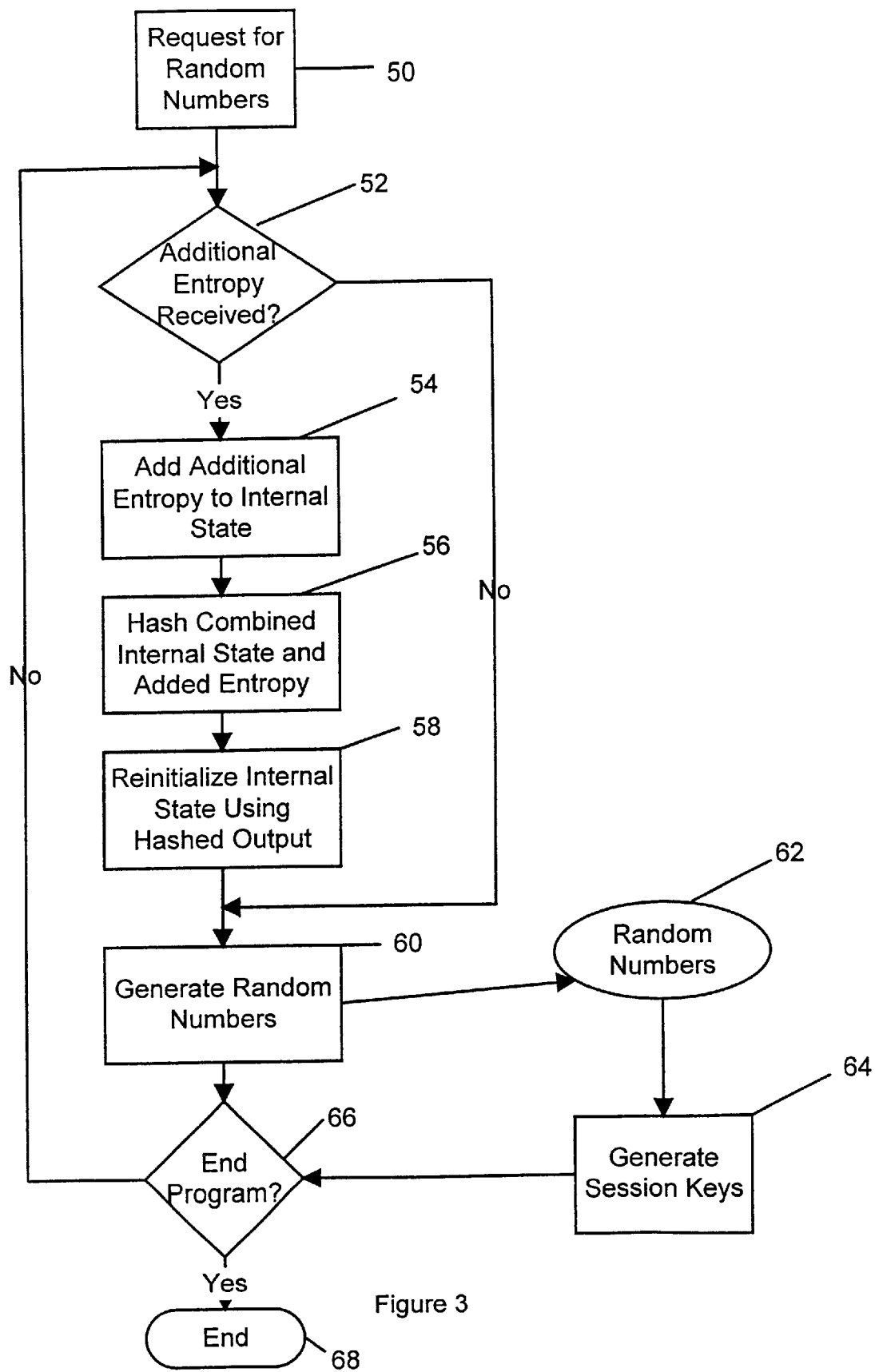
FIG. 3 is a flowchart illustrating logic in accordance with preferred embodiment.

Referring now to FIG. 3, a flowchart illustrating a method of implementing the present invention is presented. Normally, the method of the present invention will be implemented as a computer program ("application") residing on a host computer. However, it will be appreciated by those skilled in the art that the method of the present invention may be implemented through the use of electronic hardware or through the use of a combination of hardware and software.

The random number generator is started with a request for random numbers (step 50). Normally, the internal state of the random number generator will have previously been set, based upon a prior operation. Next, the application will check to determine whether any additional sources of entropy have been received (step 52). Additional sources of entropy may consist of prior secret session keys, nonces, private/public key pairs generated for encryption protocols such as RSA or random key values utilized to implement the Diffie-Hellman key exchange protocol. If no additional sources of entropy have been received, the application will proceed to generate random numbers based on the existing internal state (step 60).

If an additional source of entropy is available, the source is appended or attached to the existing internal state 10 (step 54). For example, if the source of entropy to be appended is a prior session key consisting of a first 128 bit data string and the current internal state of the random number generator is a second 128 bit data string, the first data string will be stored and appended to the second data string to create a third, 256 bit data string. The first and second bit strings can, of course, be larger or smaller than 128 bits.

To preserve security during data transmissions, it is necessary to insure that any data used to initialize the random number generator does not reduce entropy. If a session key from a prior transmission is used to initialize the random number generator without additional measures, it is conceivable that an attacker could subvert the internal status of the random number generator. An attacker, by repeatedly initiating communications and generating a session key, for example all zeros or ones, could possibly determine the internal status of the random number generator and predict the values of the numbers generated. Consequently, it is necessary to further manipulate data utilized to initialize the random number generator.

Therefore, after the first and second bit strings have been combined to form a third bit string, the third bit string is "hashed" utilizing a one-way hash function (step 56). Exemplary "hash" one-way functions include MD5 (Rivest, 1992), or SHA (NIST, 1993). The message digest function mixes the third bit stream to produce a fourth bit stream all, or a portion of which, is used to subsequently reinitialize the internal state of the random number generator. Preferably, the message digest function is capable of mixing an arbitrarily long stream of data to produce a fixed-length bit stream. Thus, different sources of entropy, having variable lengths may be utilized. The use of the message digest function to hash the newly added values with the prior internal state of the random number generator insures that the output values used to reinitialize the internal state of the random number generator are secret. Further, mixing or hashing the prior internal state of the random number generator with a new source of entropy ensures that no entropy is destroyed in the process and minimizes the possibility that an attacker could subvert the system.

The fourth bit stream, the output of the hash function, is used to reinitialize the internal state of the random number generator (step 58). The random number generator then generates random numbers (step 60), which, in turn are used as session keys or used to generate session keys (step 64). The first bit string is discarded or erased and the application then checks to determine whether additional random numbers are required (step 66). If additional random numbers are required, the program returns to step 52, if not, the program terminates (step 68).

Figure 4:
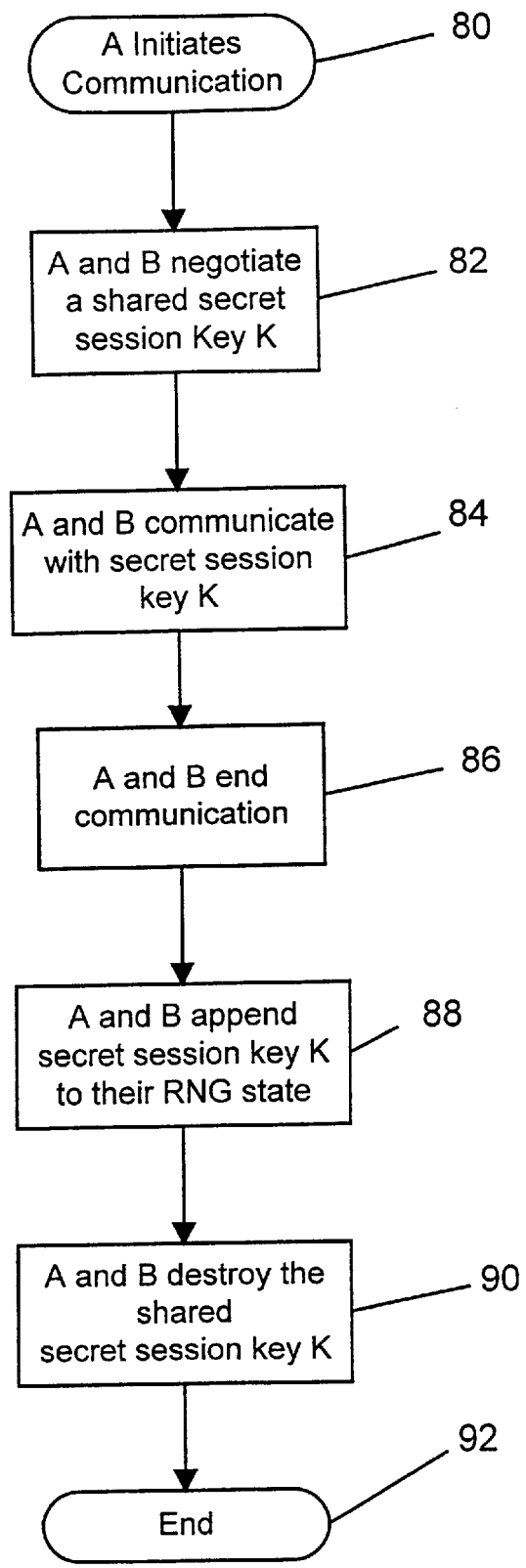
FIG. 4 is a flowchart illustrating a communication session between computers in accordance with a preferred embodiment.

Referring now to FIG. 4 a flowchart illustrating an architecture in accordance with a preferred embodiment. Computer A initiates communications with computer B via a computer network (step 80). A and B negotiate a shared secret session key K (step 82) using, for example a Diffie-Hellman key exchange protocol. A and B communicate using the shared secret session key K (step 84). After the communication has been completed (step 86), A and B each append the value of the shared secret session key K to the internal state of their respective random number generators (step 88) as previously described. The secret session key K is then discarded (step 90) before the program is terminated (step 92). The shared secret session key K is then utilized as a source of entropy in combination with the existing internal states of the random number generators utilized by A and B to produce random values to reinitialize the internal states of their respective random number generators. Since the prior internal states of the random number generators utilized by A and B are different, both random number generators will be reinitialized with different values.

The value of the method of the present invention will be further appreciated when considered in the context of computer network such as the Internet. In this context, the method of the present invention may be viewed as a method to securely share internal states between multiple random number generators. This is because the session key or nonce is generated from a host computer's random number generator and depends, in part, on the state of the host computer's random number generator. When the random value from the host computer's random number generator is added to the state of another random number generator residing in a second computer, the internal state of the second computer's random number generator now depends indirectly on the internal state of the first random number generator. It should also be noted that the method of the present invention does not require both computers to cooperate or interface beyond the normal negotiation of session keys. Neither of the computers require assistance or permission from the other to use the method as a means of gathering entropy. Thus, no incompatibilities are created by adding the functionality In a network where hundreds of computers are communicating via a host computer or file server, the method of the present invention creates a complicated web of interdependence between the internal state of the random number generator utilized by each of the individual computers. The internal state of the random number generator residing on each computer will be a function of the internal state of one or more of the computers that host has communicated with in the past and the order the communications were conducted. Thus, the internal state of each host computer's random number generator will ultimately depend on the internal state of each computer in the network. In the case of the Internet, the network would consist of millions of machines.

Employment of the method of the present invention in such a network would result in the generation of random values that would be infeasible for even the most determined attacker to attempt to predict.

The following source code presents an example of implementation of the invention. Two files are presented, the first "Channeljava" implements a SKIP functionality using the Diffie-Hellman public key encryption code to exchange session keys that encrypt all traffic passing between two SKIP hosts. SKIP can use a variety of encryption algorithms including DES, RC4 and IDEa and requires the generation of random session keys. The second file "SkipSession.java" includes code for implementing a RNG ("Random Number Generator") and code for adding session keys to the RNG's internal state. The program takes the input, in this case a session key, hashes it with the current RNG state and adds the value to the current RNG state.

```
import java.math.BigInteger;
import java.security.NoSuchAlgorithmException;
import java.security.SecureRandom;
/**
 * This class provides for a cryptographically secure channel between
 * a pair of communicating agents. The encryption is performed within
 * a SKIP style framework to avoid requiring a back-and-forth message
 * exchange to establish the session.
 *
 * <p>To establish a secure channel, each endpoint of the communication
 * should instantiate a Channel object with appropriate Diffie-Hellman
 * parameters (the secret value, the public key of the other party,
 * and the common modulus being used. The Diffie-Hellman generator
 * does not need to be supplied to the Channel class, since it is
 * implicit in the public key of the communicating party).
 * Distribution of the DH keys to the endpoints
 * of communication is not handled by the Channel class.
 *
 * <p>Once established, blocks of data may be provided to one Channel
 * object for decryption by the corresponding Channel object, and
 * vice-versa.
 * The Channel class provides for encryption and authentication of
 * the data, in-line traffic encryption key updates, and coarse-grained
 * replay protection (if enabled).
 *
```

-continued

```
 * For example:
 * <pre>
 *      BigInteger i;   // A's Diffie-Hellman secret
 *      BigInteger gi;  // A's Diffie-Hellman public key
 *      BigInteger j;   // B's Diffie-Hellman secret
 *      BigInteger gj;  // B's Diffie-Hellman public key
 *      BigInteger p;   // the Diffie-Hellman modulus being used
 * <p>
 *      Channel A = new Channel (i, gj, p, kij_des, kp_des, mac_md5, null);
 *      Channel B = new Channel (j, gi, p, kij_des, kp_des, mac_md5, null);
 * <p>
 *      // Session is now established
 *      // encrypt and decrypt functions between the pair
 *      // of Channel objects should work such that:
 *      //
 *      //      B.decrypt(A.encrypt(data)) == data
 *      //      A.decrypt(B.encrypt(data)) == data
 * <p>
 *      byte[ ] data = . . .
 *      byte[ ] enc_data = A.encrypt(data);
 *      byte[ ] dec_data = B.decrypt(enc_data);
 * <p>
 *      // dec_data should now be a copy of data
 * </pre>
 *
 * <p>Each Channel instantiates a SkipSession object to perform the
 * SKIP encryption/decryption and traffic key management functions.
 * The Channel class bundles the encrypted text, N-counter; traffic key,
 * and encryption IV for communication with the corresponding Channel
 * object, and provides a simple interface for the application to use
 * to encrypt and decrypt data.
 *
 * @version draft
 * @see SkipSession
 * @author Rich Skrenta
 */
public class Channel {
        SkipSession so;
        /*
         * XXX - We may want to use a pair of SkipSessions - one for
         * encrypting, one for decrypting - if establishing the cipher
         * state is expensive, since we reset the state on each
         * encrypt or decrypt.
         */
        /**
         * Construct a secure Channel object. A pair of Channel
         * objects are required for communication.
         *
         * <p>The Channel object should be created with
         * this party's Diffie-Hellman secret, the corresponding
         * party's public key, the common modulus being used,
         * and the desired encryption and authentication algorithms.
         *
         * <p>An optional SecureRandom object may be supplied to
         * provide entropy for seeding the random number generator
         * used the by the underlying SkipSession object to generate
         * traffic keys.
         *
         * @param secret our Diffie-Hellman secret
         * @param pubkey the DH public key of the other party
         * @param modulus the common DH modulus to use
         * @param kij_alg the key encryption algorithm to use
         * @param kp_alg the traffic encryption algorithm to use
         * @param mac_alg the authenication algorithm to use
         * @param rand optional SecureRand object to provide
         *             additional randomness for traffic key generation
         *
         * @exception NoSuchAlgorithmException if one of the algorithms
         *             specified (or MD5, which is used internally)
         *             is not available
         *
         */
public Channel(  BigInteger secret,
                 BigInteger pubkey,
                 BigInteger modulus,
                 SkipCryptKij kij_alg,
                 SkipCryptKp kp_alg,
                 SkipCryptMac mac_alg,
                 SecureRandom rand)
```

-continued

```
throws NoSuchAlgorithmException
{
                    byte[ ] randseed = null;
                    // In the future we may want to send the SecureRandom
                    // object directly in to the SkipSession object and
                    // use it there, rather than using it just to extract
                    // some seed bytes.
                    if (rand != null) {
                        randseed = new byte [20];
                        randomnextBytes (randseed);
                    }
                    so = new SkipSession(secret, pubkey, modulus,
                        kij_alg, kp_alg, mac_alg, randseed);
}
/**
 * Encrypt a block of data
 *
 * <p>The resulting data will only be decryptable by the
 * corresponding Channel object.
 *
 * @param plaintext the data to be encrypted
 * @return the encrypted data
 *        (note: size may be different than plaintext)
 */
public byte[ ] encrypt(byte[ ] plaintext)
{
            /*
             * Format of data bundle:
             *
             *    N-counter (long)
             *    length of traffic key (byte), traffic key
             *    length of iv (byte), iv
             *    length of encrypted data (int), encrypted data
             *    length of MAC (byte), MAC
             *
             * That's . . .
             *
             *    8
             *    1 + traffic_key.length
             *    1 + iv.length
             *    4 + enc_len
             *    1 + maclen
             *
             *    =
             *    15 + traffic_key.length + iv.length + enc_len + maclen
             */
            int i;
            so.newKey();
            long ncounter = so.getNcounter();
            byte[ ] enc_text = so.encrypt(plaintext, 0, plaintext.length);
            byte[ ] traffic_key = so.getTrafficKey();
            byte[ ] iv = so.getIV();
            int maclen = so.getMacLength();
            int enc_len = enc_text.length;
            int len = 15 + traffic_key.length + iv.length + enc_len + maclen;
            byte[ ] buf = new byte[len];
            int pos = 0;
            for (i = 0; i < 8; i++)
                buf[pos++] = (byte) ((ncounter & (0xFF << i*8)) >> i*8);
            buf[pos++] = (byte) traffic_key.length;
            System.arraycopy(traffic_key, 0, buf, pos, traffic_key.length);
            pos += traffic_key.length;
            buf[pos++] = (byte) iv.length;
            System.arraycopy(iv, 0, buf, pos, iv.length);
            pos += iv.length;
            for (i = 0; i < 4; i++)
                buf[pos++] = (byte) ((enc_len & (0xFF << i*8)) >> i*8);
            System.arraycopy(enc_text, 0, buf, pos, enc_len);
            pos += enc_len;
            buf[pos++] = (byte) maclen;
            byte[ ] mac = so.mac(buf, 0, buf.length);
            System.arraycopy(mac, 0, buf, pos, mac.length);
            return buf;
}
/**
 * Decrypt a block of data encrypted by our corresponding
 * Channel object.
 *
```

-continued

```
            * @param enctext the data to be decrypted
            * @return the original plaintext
            *        (note: size may be different than enctext)
            *
            * @exception ChannelException if enctext is improperly
            *        formatted or cannot be decrypted
            */
            public byte[ ] decrypt(byte[ ] enctext)
            throws ChannelException
            {
                    int i;
                    int pos = 0;
                    int enclen = enctext.length;
                    if (pos + 8 > enclen)
                            throw new ChannelException("bad data format");
                    long ncounter = 0;
                    for (i = 0; i < 8; i++)
                            ncounter |= (enctext[pos++] & 0xFF) << i*8;
                    int traffic_key_len = enctext [pos++];
                    byte[ ] traffic_key = new byte[traffic_key_len];
                    System.arraycopy(enctext, pos, traffic_key, 0, traffic_key_len);
                    pos += traffic_key_len;
                    int iv_len = enctext [pos++];
                    byte[ ] iv = new byte[iv_len];
                    System.arraycopy(enctext, pos, iv, 0, iv_len);
                    pos += iv_len;
                    int enc_len = 0;
                    for (i = 0; i < 4; i++)
                            enc_len |= (enctext[pos++] & 0xFF) << 1*8;
                    int enc_pos = pos;
                    pos += enc_len;
                    int mac_len = enctext [pos++];
                    byte[ ] mac = new byte[mac_len];
                    System.arraycopy(enctext, pos, mac, 0, mac_len);
                    so.setNcounter(ncounter);
                    so.setIV(iv);
                    so.setTrafficKey(traffic_key);
                    if (mac_len > 0) {
                        for (i = 0; i < mac_len; i++)
                            enctext[pos+i] = 0;
                        byte[ ] computed_mac = so.mac(enctext, 0, enctext.length)
                        if (computed_mac.length != mac_len)
                            throw new ChannelException("bad MAC");
                        for (i = 0; i < mac_len; i++)
                            if (computed_mac[i] != mac[i])
                                throw new ChannelException("bad MAC");
                    }
                    byte[ ] result = so.decrypt(enctext, enc_pos, enc_len);
                    return result;
            }
            /**
            * Disable N-counters
            *
            * <p>By default, N-counters are enabled, which causes
            * encrypted blocks of data to expire after 1 hour.
            *
            * <p>This behavior may not be desireable in all
            * circumstances. Also, N-counters require
            * the clocks used by the two communicating parties
            * to be synchronized to within one hour of each other.
            *
            * <n>N-counters may be disabled if
            * both parties call <code>disableNcounter</code>
            * prior to encrypting or decrypting any data.
            */
            public void disableNcounter()
            {
                    so.disableNcounter();
            }
}
import java.util.Date;
import java.math.BigInteger;
import java.security.MessageDigest;
import java.security.NoSuchAlgorithmException;
/**
* This class provides for encryption and decryption between a
* pair of communicating agents using SKIP-style algorithm.
```

```
 * This class is not meant to be used directly by applications,
 * but by wrapper classes which provide encapulation
 * and formatting of the encrypted data and associated parameters.
 *
 * <p>A SkipSession object is created with:
 * <ul>
 *          <li>The Diffie-Hellman secret, public key of the other party, and
 *          common modulus.
 *          <br>(Or alternatively, the previously-cached shared secret)
 *          <li>The key encryption, traffic encryption, and MAC algorithms
 *          to use.
 *          <li>Whether to enable the use of N-counters for coarse-grained
 *          replay protection.
 *          <li>Entropy to provide as a seed for the random number generator.
 * </ul>
 *
 * <p>To encrypt data, the wrapper class should first call
 *          <code>newKey</code> to establish a traffic key,
 *          then <code>encrypt</code> with the
 *          data to be encrypted. The resulting block of encrypted
 *          data must be bundled with the results of calls to
 *          the following methods:
 * <ul>
 *          <li><code>getNcounter()</code> (if N-counters are enabled)
 *          <li><code>getTrafficKey()</code> - the traffic key for this block of dat
 *          <li><code>getIV()</code> - the encryption IV for this block of data
 * </ul>
 *
 * <p>If a MAC algorithm is being used to provide authentication,
 *          the encrypting wrapper should assemble the data being
 *          sent to the corresponding party, leaving a field of
 *          <code>getMacLength</code> bytes of zeroes, and then call
 *          <code>mac</code> to compute the Message Authentication Code.
 *          This MAC may then be copied into to empty field.
 *
 * <p>To decrypt data, the wrapper class should first call
 *          the following methods with the data provided in the
 *          bundle from the corresponding SkipSession:
 * <ul>
 *          <li><code>setNcounter()</code> (if N-counters are enabled)
 *          <li><code>setIV()</code> - set the IV
 *          <li><code>setTrafficKey()</code> - set the traffic key
 * </ul><p>
 *
 * Note: setTrafficKey() should be called last.
 *
 * <p>If a MAC is present in the encrypted bundle, it should
 *          be copied out and replaced with zeroes. The <code>mac</code>
 *          method may then be used to compute the MAC over the data
 *          bundle, which may then be compared with the transmitted MAC
 *          to check for data integrity.
 *
 * <p>Finally, the <code>decrypt</code> call will produce the original
 *          plaintext given the encrypted data.
 *
 * @version draft
 * @see SkipSession
 * @author Rich Skrenta
 */
public class SkipSession {
        byte[ ] ss;                        // shared secret
        long ncounter = 0;
        byte[ ] cryptor_iv;
        boolean use_ncounter = true;       // N-counter enabled?
        SkipCryptKij kij_alg;
        SkipCryptKp kp_alg;
        SkipCryptMac mac_alg;
        byte crypt_alg_no = 0;             // skip Kp algorithm number
        byte mac_alg_no = 0;               // skip mac algorithm number
        byte[ ] kp;                        // unencrypted traffic key
        byte[ ] ekp;                       // traffic key encrypted in kij_alg
        byte[ ] e_kp;                      // encryption key after key separation
        byte[ ] a_kp;                      // mac key after key separation
        MessageDigest md5;
        /**
         * Create a SkipSession
         *
         * @param secret our Diffie-Hellman secret
         * @param pubkey the DH public key of the other party
```

-continued

```
 * @param modulus the common DH modulus to use
 * @param kij_alg the key encryption algorithm to use
 * @param kp_alg the traffic encryption algorithm to use
 * @param mac_alg the authenication algorithm to use
 * @param entropy optional entropy to supply to the
 *        random number generator
 *
 * @exception NoSuchAlgorithmException if one of the algorithms
 *        specified (or MD5, which is used by SkipSession internally)
 *        is not available
 */
public SkipSession(    BigInteger secret,
                       BigInteger pubkey,
                       BigInteger modulus,
                       SkipCryptKij kij_alg,
                       SkipCryptKp kp_alg,
                       SkipCryptMac mac_alg,
                       byte[ ] entropy)
throws NoSuchAlgorithmException
{
        BigInteger shared_secret = pubkey.modPow(secret, modulus);
        init(shared_secret, kij_alg, kp_alg, mac_alg, entropy);
}
/**
 * Create a SkipSession
 *
 * @param cached_ss the pre-computed Diffie-Hellman shared
 *        secret between us and other party
 * @param kij_alg the key encryption algorithm to use
 * @param kp_alg the traffic encryption algorithm to use
 * @param mac_alg the authenication algorithm to use
 * @param entropy optional entropy to supply to the
 *        random number generator
 *
 * @exception NoSuchAlgorithmException if one of the algorithms
 *        specified (or MD5, which is used by SkipSession internally)
 *        is not available
 */
public SkipSession(    BigInteger cached_ss,
                       SkipCryptKij kij_alg,
                       SkipCryptKp kp_alg,
                       SkipCryptMac mac_alg,
                       byte[ ] entropy)
throws NoSuchAlgorithmException
{
        init(cached_ss, kij_alg, kp_alg, mac_alg, entropy);
}
/**
 * Common code for the SkipSession constructors
 */
private void init(     BigInteger shared_secret,
                       SkipCryptKij kij_alg,
                       SkipCryptKp kp_alg,
                       SkipCryptMac mac_alg,
                       byte[ ] entropy)
throws NoSuchAlgorithmException
{
        this.ss = shared_secret.toByteArray();
        rng_init(entropy);
        rng_update(this.ss);
        this.kij_alg = kij_alg;
        this.kp_alg = kp_alg;
        this.mac_alg = mac_alg;
        crypt_alg_no = (byte) kp_alg.get_algnum();
        mac_alg_no = (byte) mac_alg.get_algnum();
        md5 = MessageDigest.getInstance("MD5");
}
/**
 * Disable N-counters
 *
 * <p>By default, N-counters are enabled,
 * causing traffic keys (and hence the data encrypted
 * with them) to expire after 1 hour.
 *
 * <p>This behavior may not be appropriate in all
 * circumstances. To disable this feature,
```

```
 * both parties must call <code>disableNcounter</code>
 * prior to encrypting or decrypting any data.
 * An N-counter of zero will be used by SKIP for
 * purposes of key derivation.
 */
public void disableNcounter()
{
        use_ncounter = false;
}
/**
 * Set the N-counter state obtained from the other
 * party prior to decryption
 */
public void setNcounter(long ncounter)
{
        this.ncounter = ncounter;
}
/**
 * Obtain the N-counter used for encryption
 */
public long getNcounter()
{
        return ncounter;
}
private byte[ ] kijtokijn(byte[ ] kij)
{
        int keylen = kij_alg.get_keylen();
        byte [ ] res = new byte[keylen];
        byte [ ] ncount = new byte[4];
        // copy ncounter into ncount in ncount
        for (int i = 0; i < 4; i++)
            ncount[i] = (byte) ((ncounter & (0xFF << i*8)) >> i*8);
        md5.update(kij);
        md5.update(ncount);
        md5.update((byte) 1);
        byte[ ] dig = md5.digest();
        int len = (dig.length > keylen) ? keylen : dig.length;
        System.arraycopy(dig, 0, res, 0, len);
        if (keylen > dig.length)
        {
            len = keylen - dig.length;
            md5.update(kij);
            md5.update(ncount);
            md5.update((byte) 0);
            dig = md5.digest();
            System.arraycopy(dig, 0, res, dig.length, len);
        }
        return res;
}
private byte[ ] kp_to_Ekp(byte[ ] kp, int size)
{
        byte[ ] res = new byte[size];
        md5.update(kp);
        md5.update(crypt_alg_no);
        md5.update((byte) 2);
        byte[ ] dig = md5.digest();
        int len = (dig.length > size) ? size : dig.length;
        System.arraycopy(dig, 0, res, 0, len);
        if (size > dig.length)
        {
            len = size - dig.length;
            md5.update(kp);
            md5.update(crypt_alg_no);
            md5.update((byte) 0);
            dig = md5.digest();
            System.arraycopy(dig, 0, res, dig.length, len);
        }
        return res;
}
private byte[ ] kp_to_Akp(byte[ ] kp, int size)
{
        byte[ ] res = new byte[size];
        md5.update(kp);
        md5.update(mac_alg_no);
        md5.update((byte) 3);
        byte[ ] dig = md5.digest();
        int len = (dig.length > size) ? size : dig.length;
        System.arraycopy(dig, 0, res, 0, len);
        if (size > dig.length)
```

-continued

```
            {
                    len = size - dig.length;
                    md5.update(kp);
                    md5.update (mac_alg_no);
                    md5.update((byte) 1);
                    dig = md5.digest();
                    System.arraycopy(dig, 0, res, dig.length, len);
            }
            return res;
    }
    /**
     * Generate a new traffic key to use for encryption.
     *
     * <p>If <code>use_ncounter</code> is true, the current
     * N-counter will be determined and set. Otherwise
     * 0 will be used for an N-counter.
     */
    public void newKey()
    {
            if (use_ncounter)
                    ncounter = current_ncounter();
            else
                    ncounter = 0;
            int e_keylen = kp_alg.get_keylen();
            int a_keylen = mac_alg.get_keylen();
            // The length of kp should be the size of larger of the two
            // algorithms (crypt,mac), rounded up to the block size of
            // the kij algorithm.
            int keylen = (a_keylen < e_keylen) ? e_keylen : a_keylen;
            kp = rng_get_bytes(keylen);
            cryptor_iv = rng_get_bytes(kp_alg.get_ivlen());
            e_kp = kp_to_Ekp (kp, e_keylen);
            a_kp = kp_to_Akp(kp, a_keylen);
            byte[ ] kijn = kijtokijn(ss);
            kij_alg.setkey(kijn);
            ekp = new byte[kp.length];
            kij_alg.encrypt(kp, 0, kp.length, ekp, 0);
            kp_alg.set_iv(cryptor_iv);
            kp_alg.setkey(e_kp);
            mac_alg.set_key(a_kp);
    }
    /**
     * Same function as <code>newKey()</code>, but
     * allows entropy to be added to the random number
     * generator pool.
     *
     * @param entropy entropy to add to the RNG pool
     */
    public void newKey(byte[ ] entropy)
    {
            rng_update (entropy);
            newKey();
    }
    /**
     * Set the traffic key for decryption<p>
     *
     * Should be called after setIV() and setNcounter()
     *
     * @param ekp traffic key that arrived with
     *        the encrypted data
     */
    public void setTrafficKey(byte[ ] ekp)
    {
            this.ekp = ekp;
            byte[ ] kijn = kijtokijn(ss);
            kij_alg.setkey(kijn);
            kp = new byte[ekp.length];
            kij_alg.decrypt(ekp, 0, ekp.length,
            kp_alg.set_iv(cryptor_iv);
            kp_alg.setkey(kp);
            rng_update(kp);
    }
    /**
     * Obtain the traffic key which was used for encryption
     */
    public byte[ ] getTrafficKey()
    {
            return ekp;
    }
```

```
/**
 * Obtain the iv which was used for encryption
 */
public byte[ ] getIV()
{
        return cryptor_iv;
}
/**
 * Set the iv for decryption
 */
public void setIV(byte[ ] iv)
{
        cryptor_iv = iv;
}
/**
 * Encrypt a chunk of data using SKIP and the encryption
 * algorithms specified when SkipSession was created.
 *
 * @param plaintext the data to be encrypted
 * @param offset offset into plaintext to start at
 * @param len number of bytes from plaintext to use
 * @return the encrypted data (may be a different size than len)
 */
public byte[ ] encrypt(byte[ ] plaintext, int offset, int len)
{
        byte[ ] result = new byte[kp_alg.get_encrypted_size(len)];
        kp_alg.encrypt(plaintext, offset, len, result, 0);
        return result;
}
/**
 * Decrypt a chunk of SKIP-encrypted data
 *
 * @param enctext the encrypted data
 * @param offset offset into enctext to start at
 * @param len number of bytes of encrypted data
 * @return the unencrypted data (may be a different size than len)
 */
public byte[ ] decrypt(byte[ ] enctext, int offset, int len)
{
        byte[ ] result = new byte[len];
        int newlen = kp_alg.decrypt(enctext, offset, len, result, 0);
        if (newlen != len)
        {
            byte[ ] newres = new byte[newlen];
            System.arraycopy(result, 0, newres, 0, newlen);
            result = newres;
        }
        return result;
}
/**
 * Compute a MAC (Message Authentication Code) over the given text
 *
 * @param text the data over which the MAC is to be computed
 * @param offset the offset into text to begin at
 * @param len the number of bytes to MAC
 *
 * @return the computed MAC
 */
public byte[ ] mac(byte[ ] text, int offset, int len)
{
        byte[ ] result = new byte[mac_alg.get_maclen()];
        mac_alg.mac(text, offset, len, result, 0);
        return result;
}
/**
 * Return the size in bytes which a MAC will occupy
 * given the MAC algorithm specified in the constructor.
 *
 * @return yields 0 if no MAC is being used
 */
public int getMacLength()
{
        return mac_alg.get_maclen();
}
// SKIP Random Number Generator
// may be augmented with entropy supplied from SecureRand
// or other sources
/*
```

-continued

```
 * The amount of entropy which can be held by the random
 * pool is limited by the pool's size. The pool should
 * be large enough to hold sufficient entropy to satisfy
 * the demands which will be made upon it. Generally SKIP
 * requires 16-byte traffic keys.
 */
static final int rng_pool_size = 83;
static byte[ ] rng_pool;
static int rng_pool_index; /* pool position to fold hashes in at */
static int rng_counter;
static MessageDigest rng_digest;
/**
 * Initialize the SKIP random number generator pool.
 * One pool is kept for all instances of SkipSession.
 *
 * <p>We seed the random pool with:
 * <ul>
 *         <li>The time.
 *         <li>The shared secret.
 *         <li>Decrypted packet keys we get from the other party.
 *         <li>Entropy supplied by the application through the
 *             constructor or the <code>newKey</code> method.
 * </ul>
 *
 * @param entropy entropy to seed the random number generator.
 *        May be null, but this is not suggested.
 */
private void rng_init(byte[ ] entropy)
throws NoSuchAlgorithmException
{
        if (rng_pool == null)
        {
            rng_pool = new byte[rng_pool_size];
            rng_pool_index = 0;
            rng_counter = 1;
            rng_digest = MessageDigest.getInstance("MD5");
            rng_update(System.currentTimeMillis());
        }
        if (entropy != null)
            rng_update(entropy);
}
/**
 * Add a hash to the random pool.
 *
 * <p>Each byte of the hash is xor'd into the pool.
 * The position at which the hash is xor's will walk
 * upwards through the pool until it wraps around.
 */
private void rng_fold_hash_into_pool(byte[ ] hash) {
        int i;
        for (i = 0; i < hash.length; i++) {
            rng_pool[rng_pool_index++] ^= hash[i];
            if (rng_pool_index >= rng_pool.length)
                rng_pool_index = 0;
        }
}
/**
 * Update the random pool with a long value.
 *
 * <p>Hashes the pool with the value and folds the result back in.
 *
 * @param stuff long value to hash into the random pool
 */
private void rng_update(long stuff) {
        // pool[pos++] = MD5(pool | stuff)
        rng_digest.update (rng_pool);
        // No MessageDigest.update(long)
        byte[ ] buf = new byte[8];
        for (int i = 0; i < 8; i++)
            buf[i] = (byte) ((stuff & (0xFF << i*8)) >> i*8);
        rng_digest.update (buf);
        rng_fold_hash_into_pool (rng_digest.digest());
}
/**
```

-continued

```
 * Update the random pool with some entropy
 *
 * <p>Hashes the pool with the given bytes and folds the
 * result back in.
 *
 * @param stuff byte array to hash into the random pool
 */
private void rng_update(byte[ ] stuff) {
        // pool[pos++] = MD5(pool | stuff)
        rng_digest.update(rng_pool);
        rng_digest.update(stuff);
        rng_fold_hash_into_pool(rng_digest.digest());
}
/**
 * Generate a given number of random bytes
 *
 * <p>Updates the random pool with the current time.
 * Then hashes the pool to produce the output bytes.
 *
 * <p>If more bytes are needed than are produced from a
 * single hash, the pool will be updated with an
 * incrementing counter, and the pool hashed again.
 * This is repeated until enough bytes have been produced.
 *
 * @param numbytes the number of random bytes to generate
 */
private byte[ ] rng_get_bytes(int numbytes) {
        byte[ ] ret new byte[numbytes];
        int pos = 0;
        rng_update(System.currentTimeMillis());
        while (pos < numbytes) {
            int len;
            byte[ ] digest = rng_digest.digest(rng_pool);
            len = digest.length;
            if (len > numbytes – pos)
                len = numbytes – pos;
            System.arraycopy(digest, 0, ret, pos, len);
            pos += len;
            rng_update (rng_counter++);
        }
        return ret;
}
// SKIP N-counter time
static private final long UNIXSTART=2208988800L;              // in NTP Time
static private final long NCOUNTERSTART=2997907200L;          // in NTP Time
/**
 * Determine the current N-counter.
 *
 * <p>The N-counter is the number of hours since
 * Jan 1, 1995 00:00:00 UTC. See the SKIP specification
 * for more details.
 */
private long current_ncounter() {
        Date now = new Date();
        return ((now.getTime()/1000+UNIXSTART)–NCOUNTERSTART)/3600;
}
}
```

While the present invention has been disclosed and discussed in connection with the above-described embodiment, it will be apparent to those skilled in the art that numerous changes, variations and modifications within the spirit and scope of the invention are possible. Accordingly, it is therefore intended that the following claims shall encompass such variations and modifications.

What is claimed is:

1. A method for generating a session key for use in electronic transmission comprising the steps of:

receiving entropy in the form of a first bit string from a first computer at a second computer, the first bit string being a first key that has previously been used in a first set of communications between two computers;

combining the entropy with a second bit string residing in the second computer to create a third bit string;

mixing the third bit string to create a fourth bit string;

using at least a portion of the fourth bit string to initialize the internal state of a random number generator residing in the second computer, thereby enabling a second key to be generated for use in a second set of communications between two computers;

generating a random number with the random number generator residing in the second computer after the internal state is initialized using at least a portion of the fourth bit string; and creating a second key for use in a second set of communications between two computers, the second key being created using the random number generated by the random number generator residing in the second computer.

2. The method of claim 1 wherein the first key is an encryption key and the second key is an encryption key.

3. The method of claim 2 further wherein the generated random number is used as an encryption key.

4. The method of claim 1 wherein the third bit string is mixed using a one-way function.

5. The method of claim 1 wherein the second bit string comprises the internal state of the random number generator residing on the second computer.

6. The method of claim 1 further comprising the step of deleting the first bit string after the first and second bit strings have been combined.

7. The method as recited in claim 1, wherein receiving entropy comprises:

negotiating the first key with the first computer.

8. The method as recited in claim 7, the first set of communications being between the second computer and the first computer, and the second set of communications being between the second computer and a third computer.

9. A method for generating a second session key using a random number generator by initializing the internal state of a random number generator with a first session key comprising the steps of:

receiving the first session key from a first computer at a second computer;

appending the first session key to the internal state of a random number generator residing in the second computer;

mixing the appended first session key and internal state;

using at least a portion of mixed value of the first session key and the internal state of the random number generator to reinitialize the internal state of the random number generator residing in the second computer, thereby enabling a second session key to be generated;

generating a random number with the random number generator residing in the second computer after the internal state is initialized using at least a portion of the mixed value of the first session key and the internal state of the random number generator; and creating the second session key for use in a set of communications between two computers, the second session key being created using the random number generated by the random number generator residing in the second computer.

10. The method of claim 9 wherein the first session key is a first encryption key previously used in a first session and the second session key is a second encryption key to be used in a second session.

11. The method of claim 9 wherein the first session key is mixed with the internal state of the random number generator using a one-way function.

12. The method of claim 9 wherein the first session key is negotiated by the first and second computers utilizing a key exchange protocol.

13. The method of claim 12 wherein the key exchange protocol is a Diffie-Hellman key exchange.

14. A method for generating a session key comprising the steps of:

initiating communications between a first computer and a second computer;

negotiating a first shared session key between the first and second computers;

encrypting transmissions between the first and second computers using the first session key;

appending the first session key to the internal state of a first random number generator residing on the first computer to form a first unmixed bit string;

mixing the first unmixed bit string to produce a first mixed bit string;

inputting at least a portion of the first mixed bit string into an internal state update function to update the internal state of the first random number generator residing on the first computer; and generating a random number with the first random number generator residing on the first computer after the internal state is initialized using at least a portion of the first mixed bit string, thereby enabling a second session key to be generated; and creating a second session key for use in a second set of communications between two computers, the second session key being created using the random number generated by the random number generator residing in the second computer.

15. The method of claim 14 wherein the first session key is an encryption key and the second session key is an encryption key.

16. The method of claim 14 further comprising the step of appending the second session key to the internal state of a second random number generator residing on the second computer to form a second unmixed bit string.

17. The method of claim 16 further comprising the step of mixing the second session key and the internal state of the second random number generator to produce a second mixed bit string.

18. The method of claim 17 further comprising the step of inputting at least a portion of the second mixed bit string into an internal state update function to update the internal state of the second random number generator residing on the second computer.

19. The method of claim 18 further comprising the step of generating a random number with the second random number generator residing on the second computer.

20. The method of claim 19 further comprising the step of using the random number generated by the second random number generator to create a third encryption key for use by the second computer in a subsequent communication.

21. A computer program embodied on a computer-readable medium for generating a session key comprising:

an initiation code segment that initiates communication between a first computer and second computer;

a negotiation code segment that generates a first shared session key between the first and second computers;

an encryption code segment that encrypts transmissions between the first and second computers using the first session key;

an append code segment that appends the first session key to the internal state of a random number generator residing on the first computer to form an unmixed bit string;

a mix code segment that mixes the unmixed bit string to produce a mixed bit string;

an input code segment that receives at least a portion of the mixed bit string into an internal state update function to update the internal state of the random number generator residing on the first computer;

a generate code segment that generates a random number with the random number generator residing on the first computer after the internal state of the random number generator is updated with at least a portion of the mixed bit string, thereby enabling a second session key to be generated for use in encrypting transmissions; and creating a second session key for use in a second set of communications between two computers, the second session key being created using the random number generated by the random number generator residing in the first computer after the internal state of the random number generator is updated with at least a portion of the mixed bit string.

22. A method for generating a session key comprising the steps of:
- receiving a first bit string at a computer transmitted from an entropy source external to the computer, the first bit string being a first key used in a first set of communications between two computers;
- combining the first bit string with a second bit string residing in the computer to create a third bit string;
- mixing the third bit string to create a fourth bit string;
- using at least a portion of the fourth bit string to initialize the internal state of a random number generator residing in the computer, thereby enabling a second key to be generated for use in a second set of communications between two computers;
- generating a random number with the random number generator residing on the computer after the internal state is initialized using at least a portion of the fourth bit string, thereby enabling a second key to be generated; and
- creating a second key for use in a second set of communications between two computers, the second key being created using the random number generated by the random number generator residing in the computer.

23. The method of claim 22 wherein the first key is an encryption key and the second key is an encryption key.

24. The method of claim 22 wherein the third bit string is mixed using a one-way function.

25. The method of claim 22 wherein the first bit string is an encryption key.

26. The method of claim 22 wherein the second bit string comprises the internal state of the random number generator residing on the computer.

27. The method of claim 22 further comprising the step of erasing the first bit string after the first and second bit strings have been combined.

* * * * *